United States Patent [19]

Andrews

[11] Patent Number: 5,054,201
[45] Date of Patent: Oct. 8, 1991

[54] DOUBLE INSERT DEBURRING TOOL

[76] Inventor: Edward A. Andrews, 1475 Ravine View Ct., Bloomfield Hills, Mich. 48013

[21] Appl. No.: 640,137

[22] Filed: Dec. 24, 1990

Related U.S. Application Data

[63] Continuation-in-part of Ser. No. 520,877, May 9, 1990.

[51] Int. Cl.⁵ .................... B26B 9/00; B26B 5/00; A47L 13/02; B23D 1/20
[52] U.S. Cl. .................................. 30/172; 30/169; 15/236.08; 409/303
[58] Field of Search ............... 30/169, 172, 294, 304, 30/305, 329; 15/236.01, 236.06, 236.08; 29/811.2; 409/138, 303, 296; 7/167

[56] References Cited

U.S. PATENT DOCUMENTS

| | | | |
|---|---|---|---|
| 2,114,364 | 4/1938 | Kilbride et al. | 409/303 |
| 3,327,588 | 6/1967 | Yandell | 409/296 |
| 3,895,439 | 7/1975 | Ehrenberg et al. | 15/236.06 |
| 4,608,756 | 9/1986 | Sharon | 30/172 |
| 4,668,302 | 5/1987 | Kolodziej et al. | 15/236.08 |

Primary Examiner—Douglas D. Watts
Assistant Examiner—Paul M. Heyrana, Sr.
Attorney, Agent, or Firm—Harness, Dickey & Pierce

[57] ABSTRACT

A manual tool useful for scraping, deburring and breaking the sharp edges of sheet material such as metal and glass and the like, formed of an elongated handle shaped to fit within the human hand and a pair of closely adjacent, conventional, wafer-like, hard cutter inserts mounted upon the forward end of the handle. A pair of sockets are formed on the forward end of the handle and each insert fits within a socket and is immovably held therein by means of a conventional fastener. The inserts each have a forwardly extending cutter edge, and the two cutter edges are arranged at an acute angle to form a V-shaped channel between the two inserts. The channel receives and is drawn along the sharp edge of the sheet material. The inserts are removable and replaceable, when desired, with similar inserts.

8 Claims, 1 Drawing Sheet

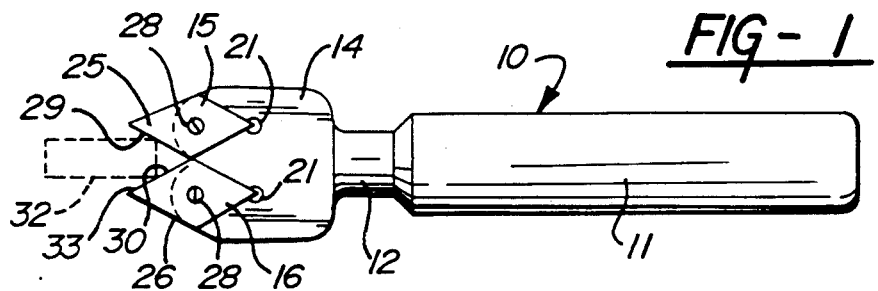
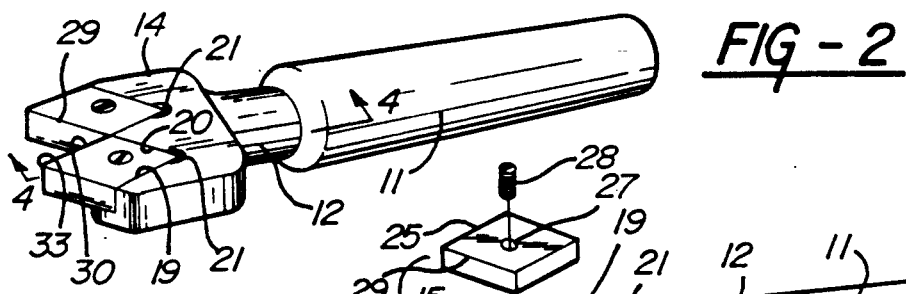
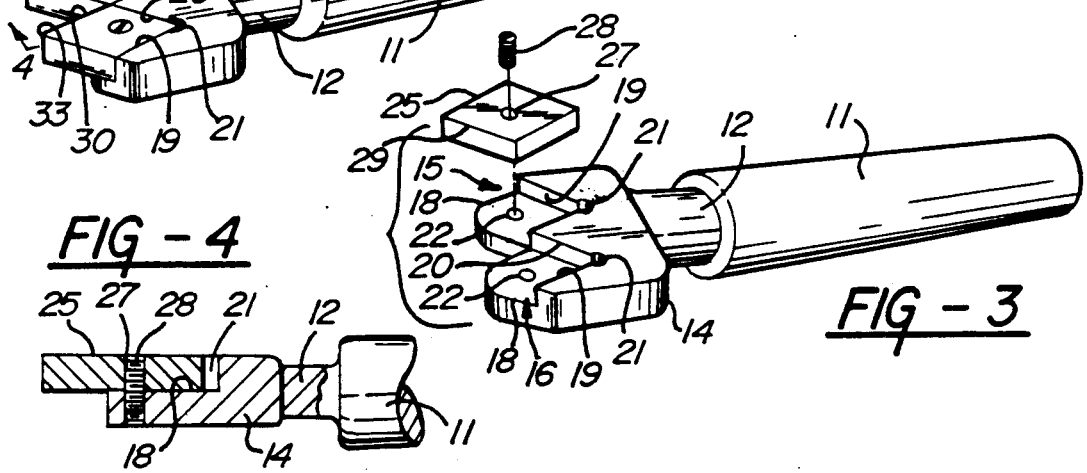
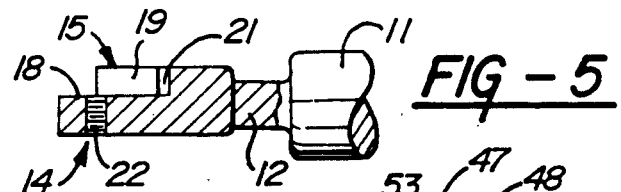
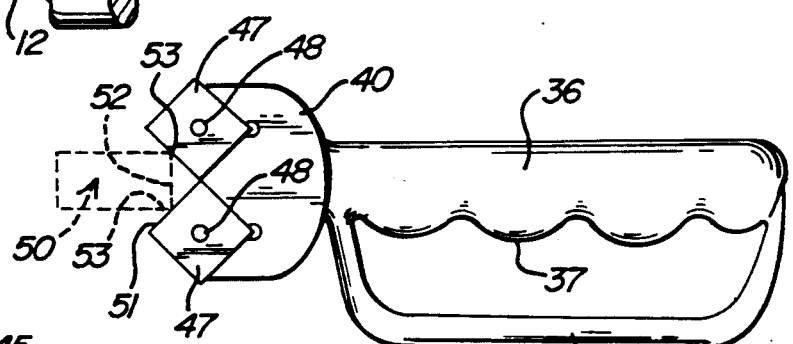
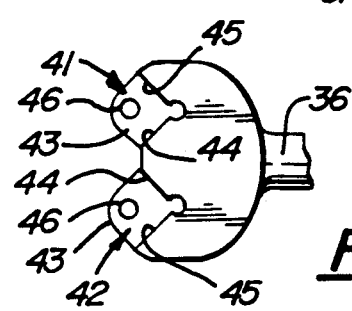

DOUBLE INSERT DEBURRING TOOL

This is a continuation-in-part of U.S. application Ser. No. 07/520,877 filed May 9, 1990 for a Manual Cutter Insert Tool.

BACKGROUND OF INVENTION

This invention relates to a manual or hand operated tool which utilizes conventional, mass-produced, machine tool cutter inserts for scraping or cutting the sharp edges of sheet material, such as sheet metal or sheet glass or the like, for the purposes of deburring or breaking the corners defining the sharp edges.

Machine tools, such as lathes, screw machines, boring machines and the like commonly utilize cutter inserts for cutting the metal work pieces. Such inserts usually are formed, in a wafer-like shape, of hard material such as tungsten carbide or other hard carbides, ceramic materials, cermet or ceramic, and coated metal compositions. Conventional inserts are formed in a variety of industry standard peripheral edge shapes. For example, conventional inserts are available in square, diamond, triangular, circular, hexagonal and other similar peripheral shapes. These inserts are typically fastened within a tool holder that is mounted upon the machine tool so that the insert edges may bear against a work piece for cutting or scraping, etc.

Conventionally, when the inserts are worn or damaged, they are replaced with similar inserts. However, such inserts, even when worn, as well as new, are ideal for cutting or scraping the sharp edges of sheet metal or glass or similar hard materials which have relatively rough edges. Thus, the invention herein is concerned with utilizing typical, conventional hard cutter inserts in connection with a hand tool which is particularly useful in trimming or scraping the edges of sheet materials.

In the prior application identified above, the hand tool described therein utilizes a single insert mounted within a hand tool for the purposes of cutting a scraping metal materials. The present application utilizes a pair of parallel inserts which between them provide a channel formed of hard cutter material which may be drawn along the sharp edges of sheet metal, sheet glass and the like sheet materials for manually deburring or breaking the sharp edges.

SUMMARY OF INVENTION

This invention contemplates providing a manually operable tool which is in the form of an elongated handle shaped to be grasped by the user in one hand for manipulating the tool. The forward end of the handle is provided with a pair of adjacent, open sockets, with each socket receiving and rigidly mounting a conventional cutter tool insert. Preferably, the inserts are diamond or square shaped so that when they are arranged side by side within their sockets, their adjacent inner edges are arranged at an acute angle to form a V-shaped channel. This channel is drawn along the sharp edge of a piece of sheet material so that the hard cutter edges scrape the sheet material edge between them. Thus, sheet edges are easily and rapidly deburred or the sharp corners defining such edges are broken or chamfered.

It is contemplated to fasten the standard or conventional inserts within their respective sockets utilizing conventional screw-type insert fasteners or other conventional fasteners. Thus, the inserts may be easily replaced with corresponding inserts when they become worn or chipped or otherwise damaged in use. In addition, this permits utilizing worn inserts to extend their life, that is, by salvaging worn inserts which have been removed from a machine tool.

One object of this invention is to provide a simple, inexpensive molded plastic or cast metal handle formed with pre-formed sockets at one end for mounting standard, commercially available inserts therein. These inserts are arranged in such a manner as to provide a V-shaped channel between their adjacent edges, through which channel a sharp sheet metal or sheet glass or the like edge may be drawn for deburring or breaking the sheet edge, that is, chamfering the corners defining the sheet edge.

Another object of this invention is to provide a simple, inexpensive, hand tool which is so inexpensive that it may be given away or sold inexpensively for use in shops as a hand working tool for scrapping, deburring, breaking or chamfering sheet edges, and the like.

These and other objects and advantages of this invention will become apparent upon reading the following description, of which the attached drawings form a part.

DESCRIPTION OF DRAWINGS

FIG. 1 is an elevational view of the manual, double insert deburring tool, with the edge of a sheet material (shown in dotted lines) positioned between its inserts.

FIG. 2 is a perspective view of the tool.

FIG. 3 is a persperctive view of the tool with the inserts removed and one of the inserts located above the tool in position for mounting thereon.

FIG. 4 is an enlarged. cross sectional view of a fragment of the tool taken in the direction of arrows 4—4 of FIG. 2.

FIG. 5 is a view similar to FIG. 4, but showing the insert removed.

FIG. 6 illustrates a modified tool utilizing square inserts for handling thicker sheet edges, and a contoured handle with a protective guard.

FIG. 7 is a fragmentary, elevational view of the head portion of the tool of FIG. 6.

DETAILED DESCRIPTION

As Illustrated in the drawings, the hand tool 10 is provided with an elongated handle 11 which is shaped to be gasped within a human hand. The specific handle shape may be varied or it may be formed as an elongated cylinder as illustrated in FIG. 1-3.

The forward end of the handle is provided with a shaft portion 12 which terminates in an enlarged head 14. The head is provided with a pair of substantially identical sockets 15 and 16 arranged closely adjacent to each other.

Each of the sockets is provided with a flat base 18, an outer wall 19 and an inner wall 20. The two inner walls of the two adjacent sockets are arranged at a V-shaped acute angle. In addition, the intersections of the inner walls with the outer walls of each socket are provided with a relief opening 21.

A threaded screw hole 22 is formed in each of the socket bases 18, as shown in FIG. 3. These screw holes accommodate conventional mounting screws for fastening the inserts within the sockets.

A pair of substantially identical inserts 25 and 26 are mounted within the respective sockets 15 and 16. Each insert is provided with a central hole 27 through which a conventional mounting screw 28 is positioned. The mounting screw threadedly engages the threaded screw hole 22 in its respective socket to securely hold the insert within the socket.

As indicated in FIG. 1-5, the sockets are shaped to closely receive diamond-shaped inserts. Therefore, two of the edges of each insert snugly about the adjacent outer wall 19 and inner wall 20 of the respective sockets to tightly hold the insert within the socket during use of the tool. This protects the inserts against damage while the tool is used.

The adjacent inserts extend forwardly and outwardly of their respective sockets. Thus, the inserts have inner, forwardly and angularly extending cutter edges 29 and 30 respectively, which together from a V-shaped space or channel 33, as illustrasted in FIG. 1 and 2.

As illustrated in dotted lines in FIG. 1, the sharp edge 31 of a piece of sheet material 32 is aranged within the V-shaped space 33 between the inserts. Thus, when the hand tool is manually drawn along the length of the sharp edge 31, burrs on the sharp edge will be trimmed off. Similarly, the opposite sharp corners defining the sheet material edge will be chamfered or broken. Thus, the tool may be used on sheet metal of varying thicknesses or on glass or similar sheet material where sharp edges or burrs must be trimmed.

FIGS. 6 and 7 illustrate a modified tool wherein the handle 36 is provided with a grip 37 shaped to better accommodate the fingers of the user's hand. In addition, a protective guard 38 is mounted upon the handle to protect the user's fingers against injury during use of the tool.

The tool includes a head 40 having a pair of adjacent sockets 41 and 42. Each socket is provided with a flat base 43, an inner wall 44 and an outer wall 45. The two walls intersect to form a V-shaped shoulder or support against which the inserts abut. Each if the sockets include a threaded hole 46. Thus, when a pair of square-shaped inserts 47 are placed within the sockets, the inserts are secured in place by means of conventional threaded screws 48.

As illustrated in dotted lines, a relatively thick piece of sheet material 50 is positioned in the V-shaped space 51 between the exposed adjacent edges of the inserts. Thus, when the tool is moved longitudinally along the edge 52 of the sheet, the sharp corners 53 defining the edge 52 will be chamfered or broken by the adjacent insert edges.

The peripheral shape of the inserts utilized may be varied. However, the shape selected should provide adjacent inner insert edges which form a generally V-shaped channel for receiving sheet material of varying thicknesses. Similarly, the means for fastening the inserts within their respective sockets may be varied. A number of conventional fastening means are available. Thus, the description of the conventional, screw-type fastener is intended to be illustrative.

This invention may be further developed within the scope of the following claims. Accordingly, it is desired that the foregoing description be read as merely illustrative of an operative embodiment of this invention and not is a strictly limiting sense.

Having fully described an operative embodiment of this invention, I now claim:

1. A hand tool useful for manually deburring and for breaking the corners defining sharp edges of sheet material such as sheet metal, sheet glass and the likes, comprising:
    an enlogated handle of a size for fitting within a hand for manually grasping the handle along its length, and with the handle having a forward end forming a head;
    a pair of substantially identical, adjacent sockets formed on the forward end head of the handle, each socket having a forwardly and sidewardly opened portion, and a substantially flat base surface arranged generally in a plane that extends longitudinally of the handle and formed with spaced apart, opposite side wall surfaces extending perpendicularly to the base surface, with the socket side wall surfaces within each socket being acutely angled relative to the forward end of the socket to form an acute angle pair of wall surfaces for receiving and supporting a corner-like portion of an insert;
    a conventional flat, generally wafer-like, hard disposable cutter insert closely fitted within each of said sockets;
    each socket being of a size to receive the insert with a flat face of the insert arranged in contact with the socket base surface and with the socket wall portions engaging opposite edge portions of said insert for removably positioning the insert within the socket, and with each insert having a forward portion extending forwardly of the handle and of the socket and an inner side edge portion extending forwardly of the socket;
    with the side edge portion of one insert being adjacent the side edge portion of the other insert and with the two adjacent side edge portions defining and acute angle spce therebetween with the space angle widening in the forward direction;
    fastening means securing each insert within its socket;
    whereby a conventional cutter insert of a predetermined peripheral shape may be rigidly secured within each socket so that a sharp edge of a sheet may be positioned between the two inner side edge portions of the inserts so that said side edge portions may be manually scraped along said sheet edge for deburring and for breaking the longitudinal corners defining said edge.

2. A hand tool as defined in claim 1 and said inserts being of the same pre-selected size and of equilateral peripheral shape, such as diamond, square, and the like, so that their adjacent side edge portions are of the same length and angularity relative to the insert, with each of the inserts being interchangeable with inserts of the same size and same peripheral shape for use within the same socket.

3. A hand tool as defined in claim 2 and said insert fastening means comprising a threaded opening formed in the socket base surface and a corresponding, aligned opening formed in the insert, and extending from one of its surfaces to the opposite surface, and including a screw-type fastener extending through the openings in the insert and the base and removably fastening the insert to the socket base.

4. A hand tool as defined in claim 3 and with the opposite face of each of the inserts being completely exposed.

5. A hard tool as defined in claim 4, and with the inserts each being formed of a conventional insert material, such as hard carbide, ceramic, ceramic coated materials and the like, with the inserts each being immovably locked within their respective sockets, between the opposed walls and the base thereof for protecting the insert against damage during use.

6. A manually operated tool for manually scraping a long, sharp edge of a sheet material work piece, comprising:

an elongated handle shaped for fitting within a human hand for manually grasping the handle, with the handle having a forward end;

a pair of wafer-like conventional, flat, hard, disposable cutter inserts mounted upon the forward end of the handle adjacent one another;

a pair of adjacent sockets formed on the forward end of the handle, with each socket closely receiving and mounting an insert, with the forward end of the sockets being open so that the onserts extend forwardly of the handle and the sockets, and with each socket including a substantially flat base surfce arranged generally in a plane that extends longitudinally of the handle, and the sockets including spaced apart, opposite side wall surfaces extending peripherally to the base surface and generally longitudinally of the handle with said side wall surfces being acutely angled relative to the forward end of the socket to form an acute angle pair of wall surfaces for receiving and supporting a corner-like portion of an insert located upon the base surface;

removable fastening means securing each insert within its socket so that the insert may be removed and replaced with other similar inserts;

said inserts each having a side edge portion which extends forwardly of the socket at an acute angle relative to the side edge portion of its adjacent insert, with said side edge portions defining a generally V-shaped channel which opens forwardly of the tool for receiving a work piece edge between the side edge portions, whereby the tool may be manually moved along the length of the work piece edge for deburring or for breaking the work piece sharp edges.

7. A hand tool as defined in claim 6, and including said insert being selected from an insert having a predetermined, equilateral, four sided peripheral shape, such as diamond-shaped or square, whereby different inserts may be substituted, one for the other, within the tool socket.

8. A hand tool as defined in claim 7, and said means for securing the insert within its socket comprising a screw fastener extending through an opening formed in the inserts and into a corresponding, aligned, threaded opening formed in its socket for releasably fastening the insert within its socket.

* * * * *